: US007987307B2

(12) United States Patent
Sarangam et al.

(10) Patent No.: US 7,987,307 B2
(45) Date of Patent: Jul. 26, 2011

(54) INTERRUPT COALESCING CONTROL SCHEME

(75) Inventors: Parthasarathy Sarangam, Portland, OR (US); Anil Vasudevan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/525,738

(22) Filed: Sep. 22, 2006

(65) Prior Publication Data

US 2008/0077724 A1    Mar. 27, 2008

(51) Int. Cl.
*G06F 13/24* (2006.01)
*G06F 13/32* (2006.01)

(52) U.S. Cl. ........ 710/260; 710/262; 710/263; 710/266; 710/268

(58) Field of Classification Search ........... 710/260–269
See application file for complete search history.

(56) References Cited

U.S. PATENT DOCUMENTS

| | | | | |
|---|---|---|---|---|
| 5,708,814 A * | 1/1998 | Short et al. | ...................... | 710/260 |
| 5,764,895 A * | 6/1998 | Chung | ...................... | 709/250 |
| 5,881,296 A * | 3/1999 | Williams et al. | ...................... | 710/263 |
| 5,905,913 A * | 5/1999 | Garrett et al. | ...................... | 710/49 |
| 5,943,479 A * | 8/1999 | Klein et al. | ...................... | 709/212 |
| 6,085,277 A * | 7/2000 | Nordstrom et al. | ...................... | 710/263 |
| 6,115,776 A * | 9/2000 | Reid et al. | ...................... | 710/260 |
| 6,192,440 B1 * | 2/2001 | Lowe et al. | ...................... | 710/260 |
| 6,195,725 B1 * | 2/2001 | Luhmann | ...................... | 710/266 |
| 6,389,526 B1 * | 5/2002 | Keller et al. | ...................... | 712/30 |
| 6,574,694 B1 * | 6/2003 | Chen et al. | ...................... | 710/263 |
| 6,615,305 B1 * | 9/2003 | Olesen et al. | ...................... | 710/262 |
| 6,633,941 B2 * | 10/2003 | Dunlap et al. | ...................... | 710/262 |
| 6,718,413 B1 * | 4/2004 | Wilson et al. | ...................... | 710/260 |
| 6,760,799 B1 * | 7/2004 | Dunlap et al. | ...................... | 710/260 |
| 7,103,693 B2 * | 9/2006 | Anand et al. | ...................... | 710/260 |
| 7,124,293 B2 * | 10/2006 | Mualem et al. | ...................... | 713/151 |
| 7,159,030 B1 * | 1/2007 | Elzur | ...................... | 709/238 |
| 7,379,453 B1 * | 5/2008 | DiMambro | ...................... | 370/363 |
| 7,478,186 B1 * | 1/2009 | Onufryk et al. | ...................... | 710/263 |
| 2003/0110281 A1 | 6/2003 | Minnick et al. | | |
| 2004/0125750 A1 * | 7/2004 | Katti et al. | ...................... | 370/252 |
| 2005/0228922 A1 * | 10/2005 | Tsao et al. | ...................... | 710/268 |
| 2006/0104303 A1 | 5/2006 | Makineni et al. | | |
| 2007/0043347 A1 * | 2/2007 | Solomita et al. | ...................... | 606/33 |
| 2007/0291778 A1 * | 12/2007 | Huang et al. | ...................... | 370/410 |

FOREIGN PATENT DOCUMENTS

| | | | |
|---|---|---|---|
| EP | 752799 A2 * | 1/1997 | |
| JP | 04053333 A * | 2/1992 | |
| JP | 04354222 A * | 12/1992 | |
| JP | 05183581 A * | 7/1993 | |
| JP | 2000261497 A * | 9/2000 | |
| JP | 2001156851 A * | 6/2001 | |
| JP | 2010244179 A * | 10/2010 | |

OTHER PUBLICATIONS

Miura et al., "RI2N/DRV: Multi-link ethernet for high-bandwidth and fault-tolerant network on PC clusters," Parallel & Distributed Processing, 2009. IPDPS 2009. IEEE International Symposium on , pp. 1-7, May 23-29, 2009.*
Regnier et al., "TCP onloading for data center servers," Computer , vol. 37, No. 11, pp. 48-58, Nov. 2004.*

(Continued)

*Primary Examiner* — Faisal M Zaman

(57) ABSTRACT

In an embodiment, a method is provided. The method of this embodiment provides determining a flow context associated with a receive packet; and if the flow context complies with a dynamic interrupt moderation policy having one or more rules, generating an interrupt to process the receive packet substantially independently of an interrupt generated in accordance with an interrupt coalescing scheme ("coalesced interrupt"). Other embodiments are disclosed and/or claimed.

18 Claims, 4 Drawing Sheets

OTHER PUBLICATIONS

Loeser et al., "Using Switched Ethernet for Hard Real-Time Communication," Parallel Computing in Electrical Engineering, 2004. PARELEC 2004. International Conference on , pp. 349-353, Sep. 7-10, 2004.*

Shen-Ming et al., "Design and implementation of the high speed TCP/IP Offload Engine," Communications and Information Technologies, 2007. ISCIT '07. International Symposium on , pp. 574-579, Oct. 17-19, 2007.*

* cited by examiner

INTERRUPT COALESCING CONTROL SCHEME

FIELD

Embodiments of this invention relate an interrupt coalescing control scheme.

BACKGROUND

Packet latency may be affected by processor utilization. On a per packet basis, one of the main contributors to processor utilization includes interrupt processing. For example, when a packet arrives at a network controller, the network controller may interrupt the system to indicate that a packet is available for processing. On a typical system, for example, processing an interrupt may consume approximately 8000 processor cycles. Hypothetically, if a network controller interrupts the system for every packet it receives, then a 10 Gigabit Ethernet network controller would interrupt the system approximately 856000[1] times a second.

To achieve high efficiency (i.e., low processor utilization), therefore, the number of interrupts may be reduced. A common technique for reducing interrupts is using interrupt coalescing. Interrupt coalescing refers to a scheme in which the network controller waits for a condition to be met before interrupting the system, where the condition may be the arrival of a certain number of packets or the passing of a fixed amount of time. While increasing efficiency is desirable for certain applications (e.g., bulk data transfers), current schemes for achieving high efficiency, such as interrupt coalescing, may also increase packet latency, which may be unacceptable for certain applications (e.g., latency sensitive applications such as remote procedure calls, file system protocols, and RTSP (real time streaming protocol), RFC 2326 published April 1998, available from IETF (Internet Engineering Task Force), for example). For example, if a particular interrupt coalescing scheme generates an interrupt after every nth packet is received, then the nth+1 packet would remain in the network controller buffers until generation of the next interrupt.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Examples described below are for illustrative purposes only, and are in no way intended to limit embodiments of the invention. Thus, where examples may be described in detail, or where a list of examples may be provided, it should be understood that the examples are not to be construed as exhaustive, and do not limit embodiments of the invention to the examples described and/or illustrated.

Figure 1:
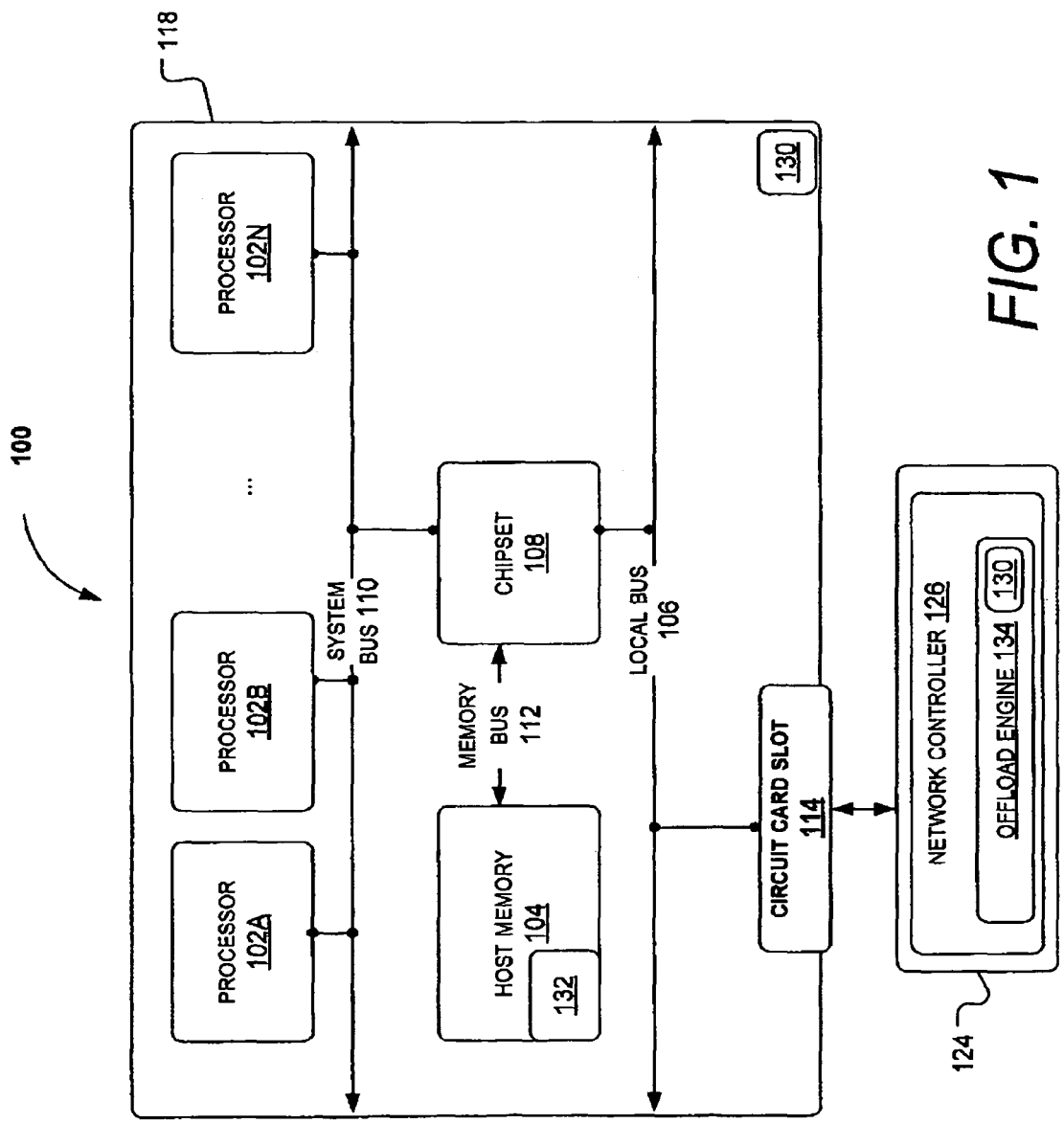
FIG. 1 illustrates a system according to an embodiment.

FIG. 1 illustrates a system in an embodiment. System 100 may comprise one or more processors 102A, 102B, . . . , 102N, host memory 104, busses 106, 110, 112 and chipset 108. System 100 may comprise more than one, and other types of memories, buses, and network adapters; however, those illustrated are described for simplicity of discussion. Processors 102A, 102B, . . . , 102N, host memory 104, bus 106, and chipset 108 may be comprised in a single circuit board, such as, for example, a system motherboard 118.

System may comprise logic 130. Logic 130 may comprise hardware, software, or a combination of hardware and software (e.g., firmware). For example, logic 130 may comprise circuitry (i.e., one or more circuits), to perform operations described herein. For example, logic 130 may comprise one or more digital circuits, one or more analog circuits, one or more state machines, programmable logic, and/or one or more ASIC's (Application-Specific Integrated Circuits). Logic 130 may be hardwired to perform the one or more operations. Alternatively or additionally, logic 130 may be embodied in machine-executable instructions 132 stored in a memory, such as memory 104, to perform these operations. Alternatively or additionally, logic 130 may be embodied in firmware. Logic may be comprised in various components of system 100, including network controller 126, offload engine 134, chipset 108, processors 102A, 102B, . . . , 102N, and/or on motherboard 118. Logic 130 may be used to perform various functions by various components as described herein.

Each processor 102A, 102B, . . . , 102N may be a coprocessor. In an embodiment, one or more processors 102A, 102B, . . . , 102N may perform substantially the same functions. Any one or more processors 102A, 102B, . . . , 102N may comprise, for example, an Intel® Core™ Duo microprocessor that is commercially available from the Assignee of the subject application. Of course, alternatively, any of processors 102A, 102B, . . . , 102N may comprise another type of processor, such as, for example, a microprocessor that is manufactured and/or commercially available from Assignee, or a source other than the Assignee of the subject application, without departing from embodiments of the invention.

Host memory 104 may store machine-executable instructions 132 that are capable of being executed, and/or data capable of being accessed, operated upon, and/or manipulated by logic, such as logic 130. Host memory 104 may, for example, comprise read only, mass storage, random access computer-accessible memory, and/or one or more other types of machine-accessible memories. The execution of program instructions 130 and/or the accessing, operation upon, and/or manipulation of this data by logic 130, for example, may result in, for example, system 100 and/or logic 130 carrying out some or all of the operations described herein.

Bus 106 may comprise a bus that complies with the Peripheral Component Interconnect (PCI) Local Bus Specification, Revision 2.2, Dec. 18, 1998 available from the PCI Special Interest Group, Portland, Oreg., U.S.A. (hereinafter referred to as a "PCI bus"). Alternatively, for example, bus 106 may comprise a bus that complies with the PCI Express Base Specification, Revision 1.1, Mar. 28, 2005 available from the PCI Special Interest Group (hereinafter referred to as a "PCI Express bus"). Bus 106 may comprise other types, configurations, and versions of bus systems, either currently available, and/or future extensions thereof.

Chipset 108 may comprise one or more integrated circuit chips, such as those selected from integrated circuit chipsets commercially available from the Assignee of the subject application (e.g., graphics, memory, and I/O controller hub chipsets), although other one or more integrated circuit chips may also, or alternatively, be used. Chipset 108 may comprise a host bridge/hub system that may couple processor 102A, 102B, . . . , 102N, and host memory 104 to each other and to local bus 106. Chipset 108 may communicate with memory 104 via memory bus 112 and with processors 102A, 102B, ..., 102N via system bus 110. In alternative embodiments, processor 102 and host memory 104 may be coupled directly to bus 106, rather than via chipset 108.

Network controller 126 may be comprised in a circuit card 124 that may be inserted into a circuit card slot 114. Network controller 126 may comprise logic 130 to perform operations described herein as being performed by network controller 126 and/or system 100. When circuit card 124 is inserted into circuit card slot 114, bus connector (not shown) on circuit card slot 114 may become electrically and mechanically coupled to bus connector (not shown) on circuit card 124. When these bus connectors are so coupled to each other, logic 130 in circuit card 124 may become electrically coupled to bus 106. When logic 130 is electrically coupled to bus 106, any of host processors 102A, 102B, ..., 102N may exchange data and/or commands with logic 130 via bus 106 that may permit one or more host processors 102A, 102B, ..., 102N to control and/or monitor the operation of logic 130.

Network controller 126 may comprise, for example, a NIC (network interface card). Rather than reside on circuit card 124, network controller 126 may instead be comprised on system motherboard 118. Alternatively, network controller 126 may be integrated with chipset 108, integrated with one or more of host processors 102A, 102B, ..., 102N, or directly connected to one or more of host processors 102A, 102B, ..., 102N. Furthermore, although connectivity of network controller 126 to processors 102A, 102B, ..., 102N is illustrated as passing through chipset 108, it is alternatively possible for network controller 126 to be directly coupled to system bus 110. In an embodiment, network controller 126 may include offload engine 134. Offload engine 134 may comprise, for example, a TCP offload engine, or a UDP (User Datagram Protocol).

Figure 2:
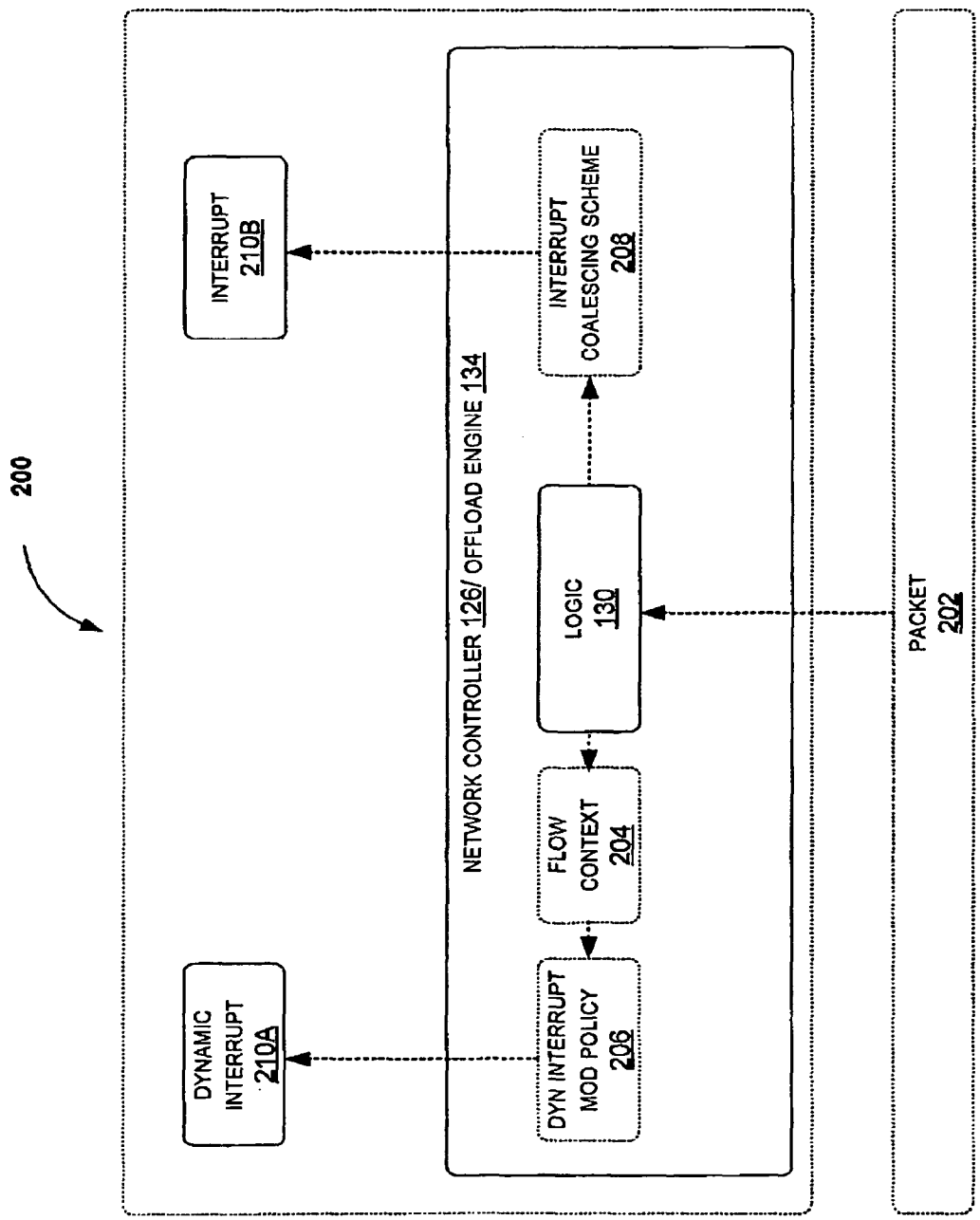
FIG. 2 illustrates a system according to an embodiment.
Figure 3:
FIG. 3 illustrates a dynamic interrupt moderation policy according to an embodiment.

FIGS. 2 and 3 illustrate a system 200 in accordance with an embodiment of the invention. Network controller 126 may receive a packet 202 ("receive packet"). "Receive packet" refers to a packet received from another system, such as over a network, and by, for example, a network controller. Receive packet 202 may comprise one or more fields that provide information about the flow. A flow refers to a physical or a logical communication channel between a transmitting system and a receiving system. The flow may be identified by a flow context 204 which may be extracted from packet 202. For example, a flow context 204 may comprise a connection context that includes a tuple of the packet's 202 source port identifier, source network address, destination port identifier, and destination network address, although embodiments of the invention are not limited in this respect. In an embodiment, the port identifier may comprise a TCP (Transport Control Protocol) port, and a network address may comprise an IP (Internet Protocol) address. Generally, flow context 204 may comprise one or more data points in a data packet that may be identified by an offset.

Logic 130 may generate an interrupt 210A, 210B as follows. Logic 130 may generate an interrupt 210A if a flow context 204 associated with packet 202 complies with a dynamic interrupt moderation policy 206. Alternatively, logic 202 may generate an interrupt 210B in accordance with an interrupt coalescing scheme 208 if the flow context 204 does not comply with a dynamic interrupt moderation policy 206. In an embodiment, logic 130 may be part of an offload engine 134 on network controller 126. However, embodiments of the invention are not limited in this respect, and logic 130 may instead be part of network controller 126 without an offload engine 134.

"Dynamic interrupt moderation policy" (hereinafter "policy") refers to a policy for generating interrupts substantially independently of interrupts generated by an interrupt coalescing scheme ("coalesced interrupt"). Such interrupts generated substantially independently of a coalesced interrupt are referred to as dynamic interrupts. An interrupt may be generated substantially independently of a coalesced interrupt if the interrupt is not triggered by an interrupt coalescing scheme. Furthermore, dynamic interrupts may be generated in addition to coalesced interrupts, or as an alternative to coalesced interrupts such as, for example, if interrupt coalescing is disabled.

As illustrated in FIG. 3, policy 206 may include one or more rules 300A, 300B, 300C, ..., 300N, where each rule 300A, 300B, 300C, ..., 300N may be associated with a flow context 302A, 302B, 302C, ..., 302N. Flow context 204 may comply with a policy 206 if policy 206 includes a rule 300A, 300B, 300C, ..., 300N that is associated with flow context 204. Any number (e.g., none or one or more) of rules 300A, 300B, 300C, ..., 300N may additionally be associated with one or more conditions 304C, 304N (for example, only two rules associated with conditions).

A "condition" refers to a state or a circumstance, such as, for example, the existence or non-existence of a parameter (e.g., receive packet is a TCP/IP packet), a threshold (e.g., receive packet size>threshold packet size), or a type (e.g., receive packet=remote procedure call). Of course, other possibilities exist. If rule 300A, 300B, 300C, ..., 300N is associated with only flow context 302A, 302B, 302C, ..., 302N, and is not associated with conditions 304C, 304N, a dynamic interrupt may be generated for all packets received on the flow context 204 without further examination. In such embodiment, interrupt coalescing may be disabled, and dynamic interrupts may be generated exclusively of coalesced interrupts.

If rule 300A, 300B, 300C, ..., 300N is associated with flow context 302A, 302B, 302C, ..., 302N, and conditions 304C, 304N, further examination may be performed to determine if the one or more conditions are present. For example, if the policy is to generate a dynamic interrupt if the packet is a TCP/IP packet, and if the packet size exceeds a threshold packet size, then a dynamic interrupt may be generated if the following are true: packet 202 is associated with a flow context 204 that is part of a rule 300A, 300B, 300C, ..., 300N, the packet 202 is a TCP/IP packet, and the size of the packet 202 exceeds some threshold size. Alternatively, the policy can specify that at least one of the conditions be present for a dynamic interrupt to be asserted (i.e., not all conditions need to be true).

At least one of the rules 300A, 300B, 300C, ..., 300N of the policy 206 may be determined by identifying packets in which one or more dynamic interrupt flags is enabled. A "dynamic interrupt flag" refers to one of a set of flags that may be enabled or disabled in a packet, where each of the set of flags identifies that a dynamic interrupt is to be generated rather than a coalesced interrupt. For example, if a "push" bit setting on a TCP header of a packet is enabled (i.e., bit used to signal an immediate notification to an application), then a dynamic interrupt may be generated for flows associated with that flow context. As another example, if the "SYN" flag is enabled in the packet, then a dynamic interrupt may be generated for flows associated with that flow context.

As another example, at least one of the rules 300A, 300B, 300C, ..., 300N of the policy 206 may be determined by monitoring one or more characteristics associated with the flows. Examples of flow characteristics include the number of packets being transmitted on the flow, the packet segment size of packets being transmitted on the flow, and whether the flow is continuous or bursty. For example, flows which are bursty may be added to the rules 300A, 300B, 300C, . . . , 300N.

At least one of the rules 300A, 300B, 300C, . . . , 300N of the policy 206 may be determined by a user. For example, a system administrator may select the flow contexts and may program network controller 126 via, for example, middleware. Furthermore, at least one of the rules 300A, 300B, 300C, . . . , 300N of the policy 206 may be predetermined. In this respect, it may be predetermined by a user (e.g., system administrators), or may be preprogrammed in network controller 126, for example. Furthermore, policy 206 may be modified by adding, deleting, or changing rules 300A, 300B, 300C, . . . , 300N, including flow contexts 302A, 302B, 302C, . . . , 302N, and/or conditions 304C, 304N.

Rules 300A, 300B, 300C, . . . , 300N of policy 206 may be maintained, for example, internally, or in a table. In a table implementation, one way that storage size may be controlled is by generating a hash using the tuples and using this hash to identify a flow. For example, systems that support receive side scaling (RSS) generate a hash using the packet tuple to direct packets to different receive queues. RSS enables receive-processing to scale with the number of available computer processors by allowing the network load from a network controller to be balanced across multiple processors. RSS is described in "Scalable Networking: Eliminating the Receive Processing Bottleneck—Introducing RSS", WinHEC (Windows Hardware Engineering Conference), Apr. 19, 2005 (hereinafter "the WinHEC Apr. 19, 2005 white paper"). The same hash function used in RSS may be used in embodiments of the invention to identify flows for managing interrupt coalescing.

Figure 4:
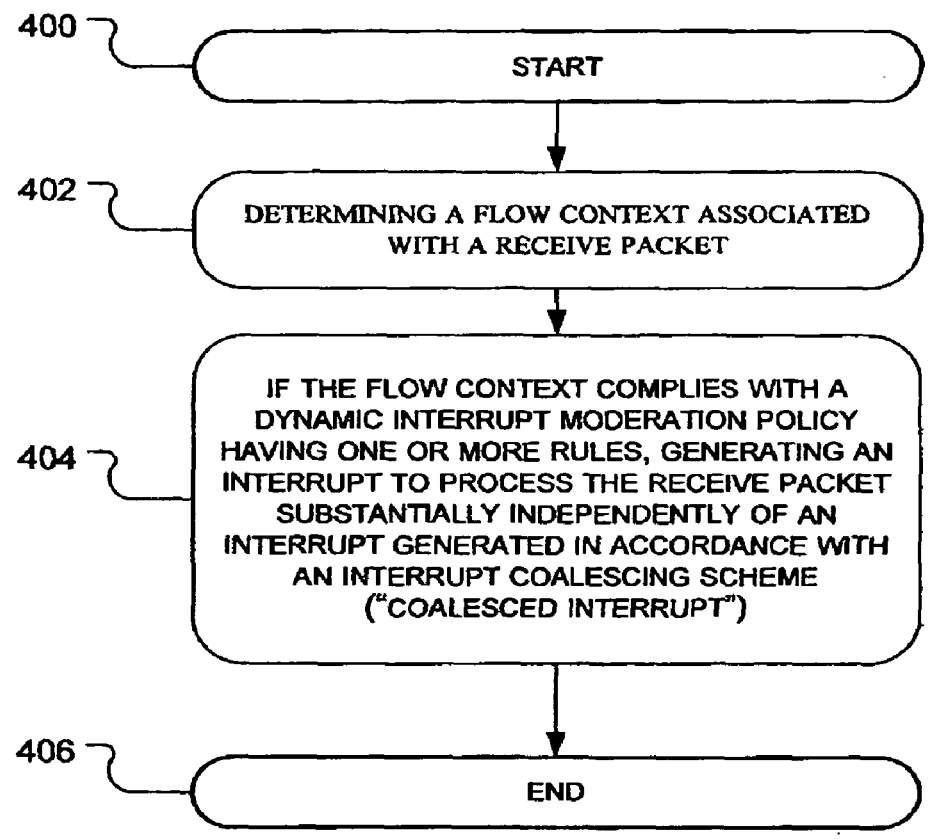
FIG. 4 is a flowchart illustrating a method according to an embodiment.

FIG. 4 illustrates a method in accordance with an embodiment of the invention. The method begins at block 400 and continues to block 402 where the method may comprise determining a flow context associated with a receive packet.

At block 404, the method may comprise if the flow context complies with a dynamic interrupt moderation policy having one or more rules, generating an interrupt to process the receive packet substantially independently of an interrupt generated in accordance with an interrupt coalescing scheme ("coalesced interrupt").

However, if the flow context does not comply with a dynamic interrupt moderation policy having one or more rules, a coalesced interrupt may be generated instead.

The method may end at block 406.

CONCLUSION

Therefore, in an embodiment, a method may comprise determining a flow context associated with a receive packet; and if the flow context complies with a dynamic interrupt moderation policy having one or more rules, generating an interrupt to process the receive packet substantially independently of an interrupt generated in accordance with an interrupt coalescing scheme ("coalesced interrupt").

Embodiments of the invention may enable a dynamic mechanism to reduce end to end network latency for certain applications that require low latency. At the same time, the dynamic mechanism provides high efficiency for other applications.

In the foregoing specification, the invention has been described with reference to specific embodiments thereof. It will, however, be evident that various modifications and changes may be made to these embodiments without departing therefrom. The specification and drawings are, accordingly, to be regarded in an illustrative rather than a restrictive sense.

What is claimed is:

1. A method, comprising:
    storing at least one identification of at least one packet flow to not perform interrupt coalescing for any received packets in the packet flow, the packet flow defined based, at least in part, on an Internet Protocol source address, an Internet Protocol destination address, a source port, and a destination port;
    determining respective packet flows associated with respective received packets, the respective packet flows defined based, at least in part, on the Internet Protocol source address, Internet Protocol destination address, source port, and destination port of the respective packets;
    determining if the respective packet flows match at least one of the stored at least one identification of at least one packet flow to not perform interrupt coalescing for any received packets in the packet flow;
    for respective received packets having associated respective packet flows matching the stored at least one identification, not performing interrupt coalescing for any packets in the respective matching packet flows, wherein not performing interrupt coalescing comprises signaling an interrupt; and
    for respective received packets not having associated respective packet flows matching the stored at least one identification, performing interrupt coalescing for at least some of the received packets not having respective matching packet flows.

2. The method of claim 1, wherein the at least one identification of at least one packet flow comprises multiple identifications.

3. The method of claim 1, wherein the at least one identification comprises a rule, the rule identifying at least one packet flow and an indication that interrupt coalescing should not be performed for any packet in the at least one packet flow.

4. The method of claim 3, further comprising storing at least one identification that comprises a rule, the rule identifying at least one packet flow and an indication that interrupt coalescing should conditionally be performed based on one more criteria indicated by the rule.

5. The method of claim 1, wherein not performing interrupt coalescing for any packets in the respective matching packet flows comprises signaling an interrupt for each received packet in a respective matching packet flow.

6. The method of claim 1, further comprising receiving the identification based on at least in part on at least one of (1) system administrator configuration of a packet flow; or (2) a computer implemented, programmatic, determination of at least one packet flow.

7. A computer program, disposed on a processor readable storage medium, comprising instructions for causing the processor to:
    store at least one identification of at least one packet flow to not perform interrupt coalescing for any received packets in the packet flow, the packet flow defined based, at least in part, on an Internet Protocol source address, an Internet Protocol destination address, a source port, and a destination port;
    determine respective packet flows associated with respective received packets, the respective packet flows defined based, at least in part, on the Internet Protocol source address, Internet Protocol destination address, source port, and destination port of the respective packets;
    determine if the respective packet flows match at least one of the stored at least one identification of at least one packet flow to not perform interrupt coalescing for any received packets in the packet flow;

for respective received packets having associated respective packet flows matching the stored at least one identification, not perform interrupt coalescing for any packets in the respective matching packet flows, wherein not performing interrupt coalescing comprises signaling an interrupt; and for respective received packets not having associated respective packet flows matching the stored at least one identification, perform interrupt coalescing for at least some of the received packets not having respective matching packet flows.

8. The computer program of claim 7, wherein the at least one identification of at least one packet flow comprises multiple identifications.

9. The computer program of claim 7, wherein the at least one identification comprises a rule, the rule identifying at least one packet flow and an indication that interrupt coalescing should not be performed for any packet in the at least one packet flow.

10. The computer program of claim 9, further comprising storing at least one identification that comprises a rule, the rule identifying at least one packet flow and an indication that interrupt coalescing should conditionally be performed based on one more criteria indicated by the rule.

11. The computer program of claim 7, wherein not performing interrupt coalescing for any packets in the respective matching packet flows comprises signaling an interrupt for each received packet in a respective matching packet flow.

12. The computer program of claim 7, further comprising receiving the identification based on at least in part on at least one of (1) system administrator configuration of a packet flow; or (2) a computer implemented, programmatic, determination of at least one packet flow.

13. A network controller comprising logic to:
store at least one identification of at least one packet flow to not perform interrupt coalescing for any received packets in the packet flow, the packet flow defined based, at least in part, on an Internet Protocol source address, an Internet Protocol destination address, a source port, and a destination port;

determine respective packet flows associated with respective received packets, the respective packet flows defined based, at least in part, on the Internet Protocol source address, Internet Protocol destination address, source port, and destination port of the respective packets;

determine if the respective packet flows match at least one of the stored at least one identification of at least one packet flow to not perform interrupt coalescing for any received packets in the packet flow;

for respective received packets having associated respective packet flows matching the stored at least one identification, not perform interrupt coalescing for any packets in the respective matching packet flows, wherein not performing interrupt coalescing comprises signaling an interrupt; and for respective received packets not having associated respective packet flows matching the stored at least one identification, perform interrupt coalescing for at least some of the received packets not having respective matching packet flows.

14. The network controller of claim 13, wherein the at least one identification of at least one packet flow comprises multiple identifications.

15. The network controller of claim 13, wherein the at least one identification comprises a rule, the rule identifying at least one packet flow and an indication that interrupt coalescing should not be performed for any packet in the at least one packet flow.

16. The network controller of claim 15, further comprising storing at least one identification that comprises a rule, the rule identifying at least one packet flow and an indication that interrupt coalescing should conditionally be performed based on one more criteria indicated by the rule.

17. The network controller of claim 7, wherein not performing interrupt coalescing for any packets in the respective matching packet flows comprises signaling an interrupt for each received packet in a respective matching packet flow.

18. The network controller of claim 13, further comprising receiving the identification based on at least in part on at least one of (1) system administrator configuration of a packet flow; or (2) a computer implemented, programmatic, determination of at least one packet flow.

* * * * *